2,953,618

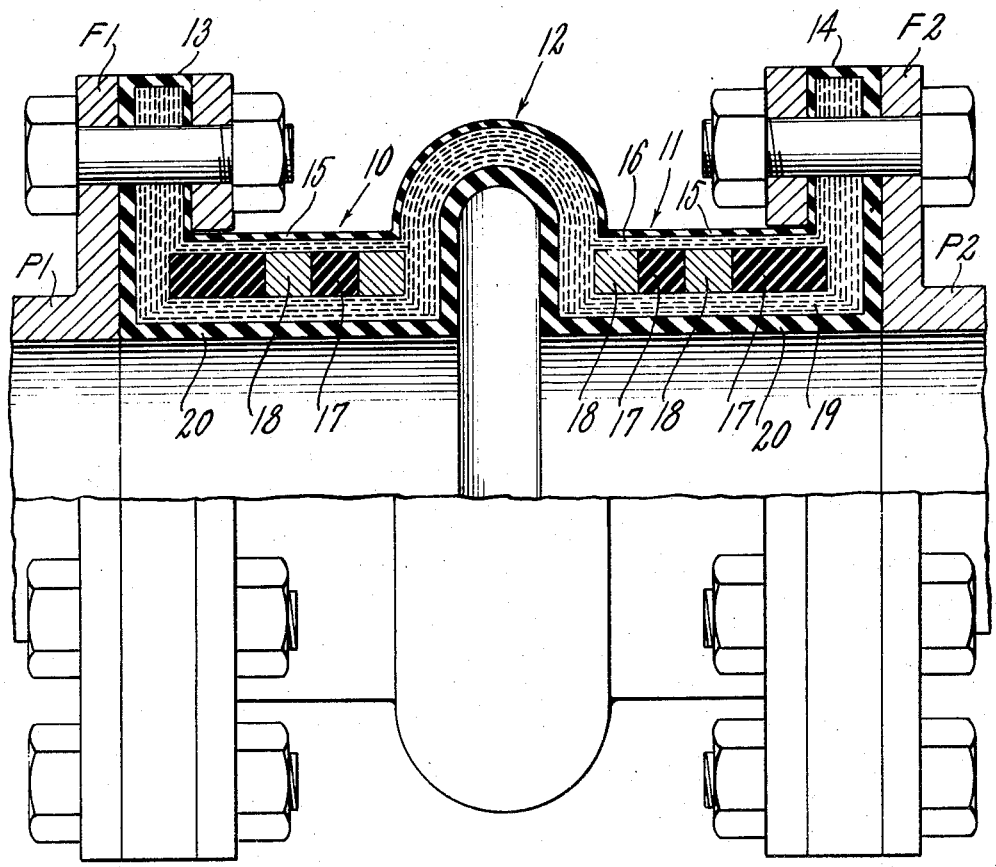

EXPANSION JOINT

Frank S. Buono, Garfield, N.J., and Robert A. Gandi, New York, N.Y., assignors to United States Rubber Company, New York, N.Y., a corporation of New Jersey Filed May 21, 1958, Ser. No. 736,837

4 Claims. (Cl. 136—56)

This invention relates to reinforced rubber expansion joints of the type having a central annular arch portion interconnecting cylindrical flanged portions. Such joints are commonly used to absorb vibration, permit expansion and contraction, or compensate for misalignment in pipe lines and associated equipment.

In United States Patent No. 1,696,435, it was proposed to reinforce the cylindrical portions of such joints with axially spaced, imbedded metal rings of circular cross section to thereby reinforce and increase the life of such joints. It has been found, however, that on continued use at elevated pressures the metal rings of such joints migrate towards the ends thereof with resulting deformation and rupture of the joint.

In an attempt to prevent such migration of the reinforcing rings, it has been proposed to use coils of wire to fill up the space between the reinforcing rings. The use of such coils, however, presents a rubber-to-metal adhesion problem, and the strength of the joints, therefore, is largely dependent on the quality of such adhesion.

In accordance with the present invention, it has been found that such coils of wire are not necessary to prevent migration of the reinforcing rings and that they may be eliminated if a filler rubber, having a hardness of at least 70 as measured on a Shore durometer scale D, is incorporated between rectangular reinforcing rings. Such a rubber is much harder than that conventionally used which has a hardness of 60 or less measured on a Shore durometer scale A. By using such a filler rubber in combination with the rectangular cross sectioned reinforcing rings the migration of the rectangular reinforcing rings is effectively prevented. Also the adhesion problem inherent in the use of coils of wire as heretofore proposed is eliminated.

Other advantages of the present invention will become apparent from the accompanying drawing which is a view partly in elevation and partly in section showing the expansion joint of the present invention interconnecting two sections of pipe.

Referring to the drawing, the expansion joint of the invention includes two flanged, generally cylindrical portions 10 and 11 which are connected together by a central arch portion 12.

In the drawing, the expansion joint is shown used to couple two pipes P1 and P2 together by bolting flanges 13 and 14 of cylindrical portions 10 and 11 to flanges F1 and F2 of the pipes. Flanges 13 and 14, as well as the pipe flanges F1 and F2 are provided with suitable bolt holes through which coupling bolts may pass.

The expansion joint, for the most part, is of conventional laminated construction and includes an outer rubber cover 15, a layer of rubber coated or impregnated fabric plies 16, a layer of filler rubber 17 in which the circumferentially extending, axially spaced metal reinforcing rings 18 are imbedded, a second layer of rubber coated or impregnated fabric plies 19, and an inner rubber cover 20.

The novel features of the expansion joint consist of using a filler rubber 17 having a hardness of at least 70 as measured on a Shore durometer (scale D) and in making the reinforcing rings 18 rectangular in cross-section. The relatively hard filler rubber 17 effectively prevents migration of the rings 18 and at the same time readily bonds to the rubberized fabric plies 16 and 19. The flat surface of the sides of the reinforcing rings 18 provides greater resistance to penetration into the filler rubber than is the case where reinforcing rings having a circular cross-section are used.

The joint is conveniently made by building up the layers on a suitable form in the conventional manner. After the joint has been built up on the form, the rubber is vulcanized so that the joint becomes essentially an integral structure.

While a preferred embodiment of the invention has been shown and described, it will be appreciated that variations can be made therein without departing from the scope of the invention. The term "rubber" is used in its generic sense to include natural rubber, synthetic rubber, and blends thereof.

Having thus described our invention, what we claim and desire to protect by Letters Patent is:

1. In an expansion joint of the type formed of plies of rubber and fabric and having a central annular arch portion interconnecting generally cylindrical portions, the improvement comprising the combination of axially-spaced circumferentially-extending metal reinforcing rings of rectangular cross-section embedded in said cylindrical portions of said joint, and filler rubber having a hardness of at least 70, as measured on a Shore durometer (scale D), interposed between said rings, the surfaces of said rings being oriented parallel and perpendicular to the longitudinal axis of said joint, thereby to present a flat surface to said filler rubber interposed between said rings.

2. An expansion joint as defined in claim 1, in which said rings are of square cross-section.

3. In an expansion joint of the type formed of plies of rubber and fabric and having a central annular arch portion interconnecting generally cylindrical portions, said cylindrical portions having axially-spaced circumferentially-extending metal reinforcing rings embedded therein between inner and outer rubber impregnated fabric plies, the improvement comprising the combination of reinforcing rings of rectangular cross-section and filler rubber having a hardness of at least 70, as measured on a Shore durometer (scale D), interposed between said rings, the surfaces of said rings being oriented parallel and perpendicular to the longitudinal axis of said joint, thereby to present a flat surface to said filler rubber interposed between said rings, the radially inner and outer surfaces of said rings being in contact with said inner and outer fabric plies, respectively.

4. An expansion joint as defined in claim 3, in which said rings are of square cross-section.

References Cited in the file of this patent

UNITED STATES PATENTS

| | | |
|---|---|---|
| 1,281,557 | Goodall | Oct. 15, 1918 |
| 1,696,435 | Fraley | Dec. 25, 1928 |
| 2,825,364 | Cullen et al. | Mar. 4, 1958 |